No. 637,015.  M. J. O'DONNELL.  Patented Nov. 14, 1899.
MOTOR VEHICLE.
(Application filed June 15, 1899.)
(No Model.)  2 Sheets—Sheet 1.
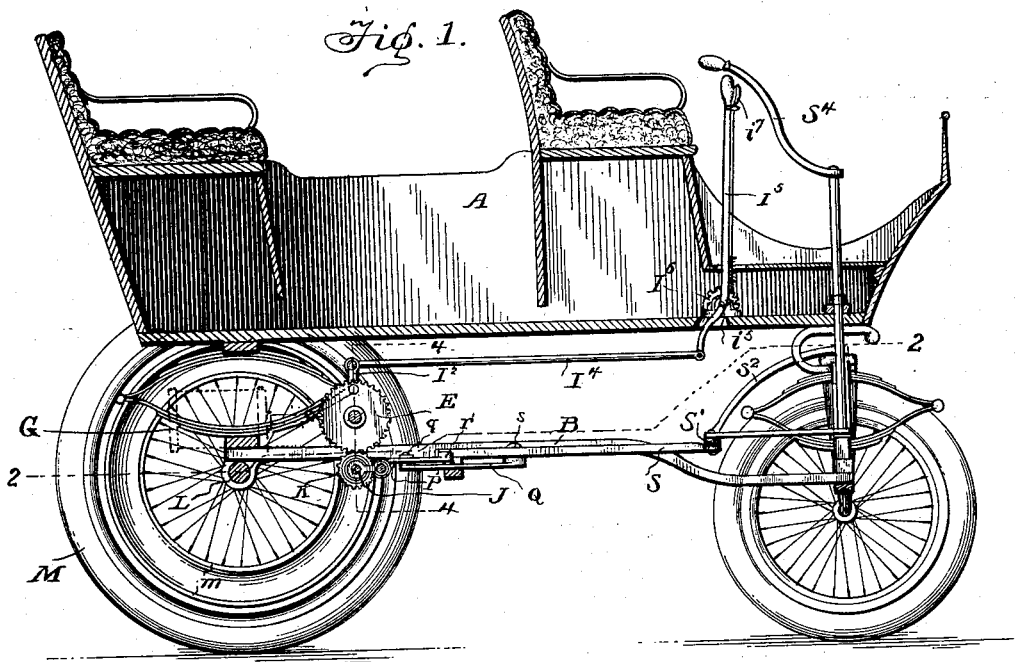
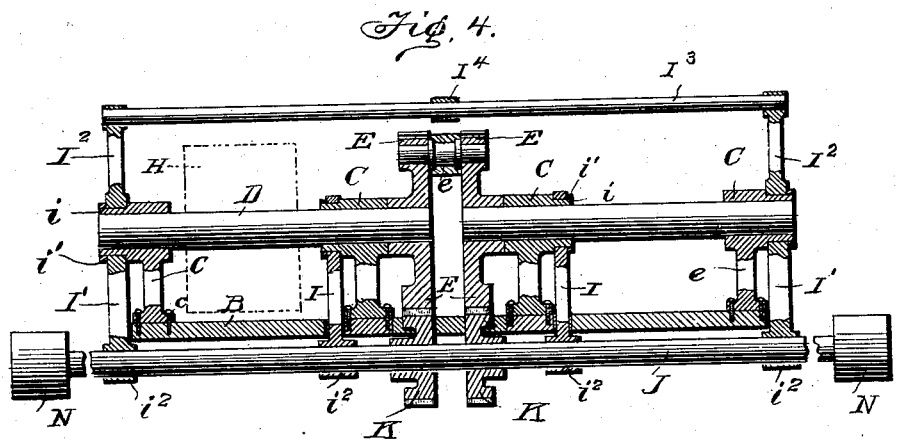
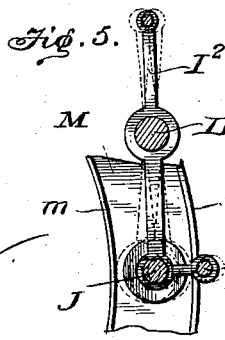
WITNESSES  INVENTOR
Michael J. O'Donnell

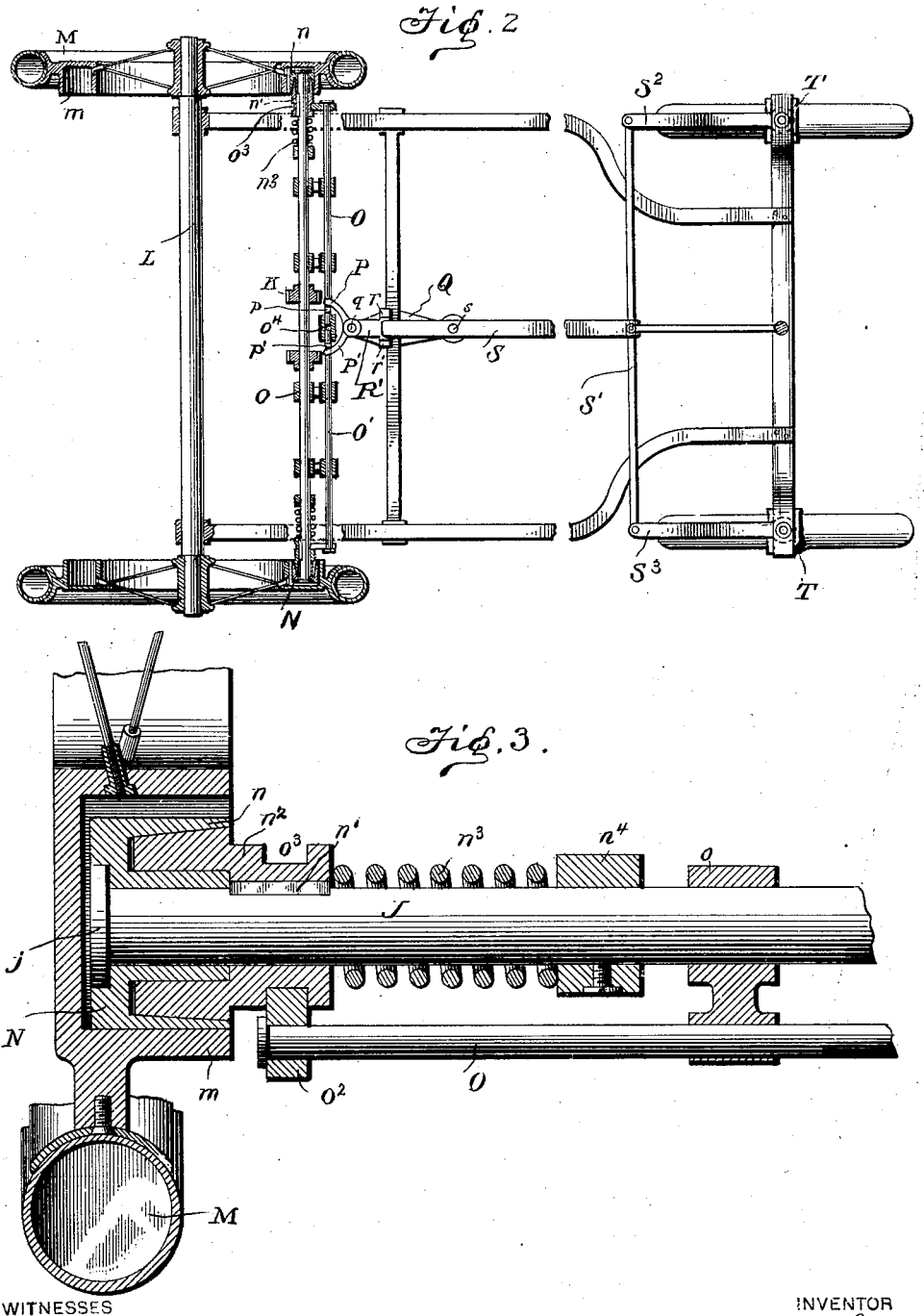

UNITED STATES PATENT OFFICE.

MICHAEL J. O'DONNELL, OF CHICAGO, ILLINOIS, ASSIGNOR TO JOSEPH A. O'DONNELL, OF SAME PLACE.

MOTOR-VEHICLE.

SPECIFICATION forming part of Letters Patent No. 637,015, dated November 14, 1899.

Application filed June 15, 1899. Serial No. 720,689. (No model.)

*To all whom it may concern:*

Be it known that I, MICHAEL J. O'DONNELL, a citizen of the United States, residing at Chicago, in the county of Cook and State of Illinois, have invented certain new and useful Improvements in Motor Vehicles or Cycles; and I do hereby declare the following to be a full, clear, and exact description of the invention, such as will enable others skilled in the art to which it appertains to make and use the same.

This invention relates to improvements in motor vehicles or cycles.

Among others, it is one object of my invention to construct an improved driving mechanism for the vehicle or cycle permitting of a quick and easy starting, stopping, and reversing of the same.

It is a further object to provide improved means whereby said starting, stopping, and reversing can be accomplished without affecting the operation of the driving-motor.

It is a further object to provide a simplified and improved differential driving mechanism for the drive-wheels of the vehicle or cycle, permitting the same to turn or move in a curved path.

It is a further object to provide means for operating said differential mechanism by the steering apparatus of the vehicle or cycle.

It is a further object to so construct the driving mechanism that the fewest possible and simplest parts and arrangement of parts consistent with efficiency and practicability may be employed.

It is a further object to generally improve and simplify the construction of the various parts.

With such and other objects in view my invention is embodied in the improved construction, combinations, and arrangements of parts hereinafter described, and particularly set forth in the claims.

In the accompanying drawings I have shown means for carrying my invention into practical effect; but I desire it understood that I do not limit my improvements in their useful application to the particular construction which for the sake of illustration I have therein delineated.

In the drawings, Figure 1 is a longitudinal sectional view illustrating a vehicle provided with my improvements. Fig. 2 is a horizontal sectional view on line 2 2 of Fig. 1, showing parts in elevation. Fig. 3 is an enlarged detail sectional view showing the differential-drive-mechanism parts. Fig. 4 is an enlarged transverse sectional view on the line 4 4 of Fig. 1. Fig. 5 is a detail view showing the relative positions of the driving-gear N.

Referring to the drawings, wherein like reference characters refer to similar parts throughout the several views, A indicates the body of a vehicle of any convenient or preferred construction, and B indicates a main supporting-frame on which the body is supported and which supports the various parts of the drive mechanism to be hereinafter described.

Secured on the main frame B in any desired manner, as by bolts $c$, are bearing-brackets C for the main drive-shaft, (indicated at D.) E E represent driving gear-wheels fixed on the shaft D, which in the drawings is shown as being divided or in two parts. Connecting the gear-wheels E E, which, as shown, are separated, is a wrist or crank pin $e$, to which a pitman F, operated by a suitable motor or engine, (illustrated generally by dotted lines at G,) is connected. This construction of the shaft and gear is a simple and strong one and is intended particularly for use in case a motor, such as a steam-engine, is employed. It is evident, however, that the shaft D can be driven directly by a motor, such as an electric motor, and that in such case one gear-wheel E only is necessary. I have therefore indicated by dotted lines at H, diagrammatically, an electric motor on the shaft D.

I I indicate bearing-arms mounted to swing about the shaft D as a center, and I' I' indicate similar arms provided with extensions $I^2$. The arms I and I' are shown as rotatably mounted on bearing portions $i$ of the shaft-supporting brackets C and are properly held thereon by means of collars $i'$. The arms I and I' are provided at their ends with bearings $i^2$, in which is journaled a shaft J, to which are fixed gear-pinions K, meshing with and driven by the gear-wheels E E. It is evident that but one gear-wheel E need be employed.

Mounted in suitable bearings, conveniently at the rear portion of the supporting-frame, is a shaft L, on which at each side of the vehicle is rotatably mounted or journaled a drive-wheel M. Each drive-wheel, which may be of any suitable type—such, for instance, as shown in the drawings—is provided near its periphery or rim with two inwardly-projecting annular flanges $m$. These flanges may be secured to the wheel in any desired manner. In the drawings they are shown in the form of flanges on an annular casting secured to the wheel-rim. The drive-wheels are so located relative to the shaft J that the ends of the latter project into the space between the two flanges $m$ on each wheel. The shaft J carries at each end a driving gear-pinion N, working between and adapted to engage either of the flanges $m$ for the purpose of driving the wheels M. The gears N are shown as being friction-gears, and the flanges $m$ may, if desired, be provided or formed with suitable friction-surfaces to insure proper engagement between the driving-pinions N and flanges $m$. The pinions N are of a construction and are mounted on the shaft J in a manner to be presently described.

It is evident that as both wheels M are positively driven by the shaft J means should be provided to enable differential motion of the wheels in turning of the vehicle. For this purpose I employ the following mechanism: The shaft J is provided at each end with a collar $j$, limiting the outward movement of the driving-pinions N, each of which is loose and rotatable on the shaft. Each driving-pinion is provided with a clutch member $n$, here shown as a beveled friction clutch-surface formed by an annular groove in the inner side of each driving-pinion. Longitudinally movable on shaft J, adjacent each pinion N and held from rotation thereon by means of a spline or feather $n'$, is a second clutch member $n^2$, having a friction clutch-surface complementary to the surface carried by the pinion and adapted, when moved longitudinally of the shaft, to frictionally engage said friction-surface. The spline or feather $n'$, it will be seen, is so located that its end abuts against and prevents inward movement of the driving-pinion. Each clutch member $n^2$ is normally held outward and in engagement with the clutch member $n$ by a spring $n^3$, sleeved on the shaft J between a collar $n^4$ fixed thereon and the clutch member $n^2$. For moving the clutch members $n^2$ inward or away from the members $n$ I provide bearing-brackets $o$ on the shaft J, each having a bearing therein. Longitudinally slidable in said bearings are rods O O', one for each clutch member $n^2$, which rods carry at their ends collars or blocks $o^2$, having fingers engaging in grooves $o^3$ in the clutch members $n^2$. The adjacent or contiguous ends of the rods O O' are shown provided with a surrounding sleeve $o^4$, secured to one rod and loosely engaging the other, so as to permit of a relative sliding movement of the rods. Near their adjacent ends the said rods are provided, respectively, with projections or collars $p\,p'$. Mounted on a pivot $q$ on a suitable part of the supporting-frame—as, for instance, on a bracket Q—is fulcrumed the lever R, having at one end two arms P and P', which extend near and are adapted to engage, respectively, the projections or collars $p\,p'$. At its other end said lever is provided with two lugs or projections $r$ and $r'$. Fulcrumed on a pivot-pin $s$ on a suitable part of the frame, such as a part of the bracket Q, is a lever S, one end of which extends between and is adapted to engage either of the projections $r\,r'$. The other end of the lever S is pivotally connected with a cross-bar S', connected at its opposite ends pivotally to arms $S^2$ and $S^3$, each carried by a supporting head or frame for the front or steering wheels of the vehicle, (indicated at T and T'.) The heads or frames for the steering-wheel are mounted in the frame in any suitable manner to permit of the turning of the wheels T and T' for the purpose of steering the vehicle. The rod S' is provided with an operating steering-handle extending into the vehicle into easy reach of the operator, (indicated at $S^4$.)

For the purpose of swinging the arms I and I' to carry the driving-pinions N into engagement with either of the friction-flanges $m$ on the driving-wheel I have shown the arms $I^2$ of the levers or arms I' connected by means of a bar $I^3$, to which is loosely connected intermediate its ends a forwardly-extending link or rod $I^4$, which is connected at its forward end pivotally with a lever $I^5$, fulcrumed at $i^5$, and provided with an operating-handle extending into the vehicle in suitable position to be operated by the operator. Any suitable means may be provided for holding the lever $I^5$ to maintain the driving-pinions in driving contact with either of the flanges $m$ or out of contact with both. For this purpose I have shown a segmental rack $I^6$, adjacent the lever, with which is adapted to engage a holding pawl or ratchet carried by the lever, which also is provided with a suitable operating-handle $i^7$ for the pawl or ratchet.

The operation is substantially as follows: With the motor in operation it is simply necessary for the operator to move the lever $I^5$ to throw the driving-pinions into contact with one of the flanges $m$. This will cause the vehicle to be propelled in one direction. If it is desired to move in the opposite direction, the lever is moved oppositely to throw the driving-pinion in contact with the other flange $m$. When it is desired to stop the vehicle, the lever is moved to an intermediate position to hold the driving-pinions out of contact with either flange. It will thus be seen that the motor does not have to be stopped in order to stop, start, or reverse the movement of the driving-wheels. For turning the vehicle the operator operates the steering-handle S⁴, thereby moving the rod S' and through it the steering-wheels T and T'. This movement of the rod S' moves the lever S on its fulcrum and causes its rear end to engage one or the other of the projections $r$ and $r'$ of the lever R and causes one or the other of its arms P P' to engage one or the other of the rods O and O', throwing one of the clutch members $n^2$ inward out of engagement with the clutch member carried by one pinion N, thus preventing the driving of one wheel M. For instance, if it is desired to turn to the right the steering-wheels, through the rod S', are turned to the right, which causes the forward end of the lever S to move to the left, throwing its rear end to the right into engagement with the projection $r'$, which moves the lever-arm P' into engagement with the projection or shoulder $p'$, whereby the rod O' is drawn inward against the tension of the spring $n^3$, thereby releasing the driving-pinion N and preventing the driving of the right-hand drive-wheel M.

Having thus described my invention, what I claim as new, and desire to secure by Letters Patent, is—

1. In a motor vehicle or cycle, the combination of a frame, drive-wheels, an inner and outer driving-flange on one of said wheels, a drive-shaft mounted in fixed bearings, a suitable drive-motor and connections to said shaft, swinging bearing-arms pivoted concentrically with said drive-shaft, a driven shaft carried by said swinging arms, drive-gear between said drive and driven shafts, a drive-pinion carried by said driven shaft located between said driving-flanges, and means for moving said swinging arms to throw said pinion into or out of driving contact with either of said flanges, substantially as described.

2. In a motor vehicle or cycle, the combination of a frame, drive-wheels, an inner and outer driving-flange on one of said wheels, a drive-shaft mounted in fixed bearings, a suitable drive-motor and connections to said shaft, swinging bearing-arms pivoted concentrically with said drive-shaft, a driven shaft carried by said swinging arms, drive-gear between said drive and driven shafts, a drive-pinion carried by said driven shaft located between said driving-flanges, extensions on two of said swinging arms, a rod connecting said extensions, and means connected with said rod for moving said swinging arms to throw said pinions into or out of driving contact with either of said flanges, substantially as described.

3. In a motor vehicle or cycle, the combination of a frame, drive-wheels, said wheels having inner and outer driving-flanges, a drive-shaft in two parts, a gear-wheel on each shaft part, a wrist-pin connecting said gear-wheels, a motor, drive connections from said motor to said wrist-pin, swinging arms pivoted concentrically with said drive-shaft, a driven shaft carried by said swinging arms and provided with pinions meshing with and driven by said gears, driving-pinions on said driven shaft each located between the flanges on one of said wheels, and means for swinging said arms to throw said driving-pinions into and out of contact with said driving-flanges, substantially as described.

4. In a motor vehicle or cycle, the combination of a frame, drive-wheels, an inner and outer driving-flange on one of said wheels, a drive-shaft, fixed bearing-brackets on the frame, in which said drive-shaft is journaled, a suitable drive-motor and connection to said drive-shaft, swinging bearing-arms pivoted concentrically with said drive-shaft on portions of said bearing-brackets, a driven shaft carried by said arms, intermeshing gears carried by said drive and driven shafts, a drive-pinion carried by said driven shaft located between driving-flanges secured to one of said drive-wheels, and means for moving said swinging arms to throw said drive-pinion into or out of engagement with either of said flanges, substantially as described.

5. In a motor vehicle or cycle, a drive-wheel, a shaft, swinging bearing-arms for said shaft, mechanism for driving said shaft, a driving-pinion loose on said shaft for driving said wheel, a clutch device movable longitudinally of said shaft, and means for moving the same into engagement with said drive-pinion for locking the same to said shaft, substantially as described.

6. In a motor vehicle or cycle, the combination with a frame, drive-wheels, a shaft, swinging bearing-arms for said shaft, means for driving said shaft, drive-pinions loose on said shaft, for driving said wheels, clutch devices longitudinally movable of said shaft, means acting normally to lock the said clutch devices to said pinions, and means for moving one of said clutch devices to release one pinion, substantially as described.

7. In a motor vehicle or cycle, the combination of a frame, drive-wheels, a shaft, swinging bearing-arms for said shaft, means for driving the shaft, clutch devices longitudinally movable of said shaft, means for normally holding said clutch devices to lock said pinions to said shaft, means for moving one of said clutch devices to release one pinion, steering means, and actuating connections from said steering means to operate said releasing means, substantially as described.

8. In a motor vehicle or cycle, the combination of a frame, drive-wheels, a shaft, swinging bearing-arms for said shaft, means for driving said shaft, drive-pinions on said shaft for said wheels, clutch devices longitudinally movable of said shaft, springs acting normally on said clutch devices to lock said pinions to said shaft, means for moving one of said clutch devices to release one of said pinions, steering means, and connections from said steering means to said releasing means for actuating the same, substantially as described.

9. In a motor vehicle or cycle, a frame, drive-wheels, a shaft, swinging bearing-arms for said shaft, means for driving the same, drive-pinions for said drive-wheels loose on said shaft, clutch devices longitudinally movable of said shaft, springs acting normally to move said clutch devices to lock said pinions to said shaft, rods movable longitudinally of said shaft, and each provided with means engaging and adapted to move one of said clutch devices, a lever having two arms each adapted to engage and move one of said rods, and means for moving said lever to operate said rods, substantially as described.

10. In a motor vehicle or cycle, a frame, drive-wheels each provided with two driving-flanges, a drive-shaft, means for driving the same, drive-pinions carried by said shaft each located between said flanges on one of said wheels, movable bearings for said shaft, means for moving said bearings to throw said pinions into or out of contact with either of said flanges, clutch devices movable longitudinally of said shaft, means for holding the same to lock said pinions to said shaft, means for moving said clutch devices to release said pinions, steering means, and connections from said steering means to said releasing means for releasing one of said pinions, substantially as described.

11. In a motor vehicle or cycle, a shaft, a pinion loose on said shaft, a collar on said shaft to hold said pinion from endwise movement on said shaft, a feather or spline on said shaft, acting to hold said pinion from longitudinal movement in one direction, a clutch device sliding on said shaft and spline, a spring encircling said shaft for holding said clutch device into engagement with said pinion, and means for moving said clutch device against the action of said spring substantially as described.

In testimony whereof I affix my signature in presence of two witnesses.

MICHAEL J. O'DONNELL.

Witnesses:
WILLIAM J. ROBINSON,
GEORGE E. TEW.